United States Patent
Kim et al.

(10) Patent No.: US 11,456,809 B2
(45) Date of Patent: Sep. 27, 2022

(54) POSITION ESTIMATION METHOD FOR ESTIMATING POSITION OF INTERFERENCE SIGNAL SOURCE AND POSITION ESTIMATION SYSTEM FOR PERFORMING THE METHOD

(71) Applicant: ELECTRONICS AND TELECOMMUNICATIONS RESEARCH INSTITUTE, Daejeon (KR)

(72) Inventors: Chung Sup Kim, Daejeon (KR); Hyuk Je Kim, Daejeon (KR); Young Jun Chong, Daejeon (KR); Jong Soo Lim, Daejeon (KR); Ju Yeon Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 967 days.

(21) Appl. No.: 16/209,629

(22) Filed: Dec. 4, 2018

(65) Prior Publication Data

US 2019/0369204 A1     Dec. 5, 2019

(30) Foreign Application Priority Data

May 31, 2018 (KR) ............ 10-2018-0062828
Nov. 2, 2018 (KR) ............ 10-2018-0133657

(51) Int. Cl.
    *H04B 15/00*     (2006.01)
    *H04B 17/27*     (2015.01)
    *H04B 17/336*     (2015.01)
    *G01S 13/46*     (2006.01)

(52) U.S. Cl.
    CPC ............ *H04B 17/27* (2015.01); *G01S 13/46* (2013.01); *H04B 17/336* (2015.01)

(58) Field of Classification Search
    CPC .... H04B 17/336; H04B 17/27; H04B 17/345; G01S 13/46; G01S 5/04; G01S 7/023
    See application file for complete search history.

(56) References Cited

U.S. PATENT DOCUMENTS

| | | | |
|---|---|---|---|
| 9,161,332 B2 * | 10/2015 | Nagata | H04W 64/003 |
| 10,419,133 B2 * | 9/2019 | Kim | H04W 4/029 |
| 2010/0150034 A1 | 6/2010 | Song et al. | |
| 2014/0125524 A1 | 5/2014 | Kim et al. | |

FOREIGN PATENT DOCUMENTS

| | | |
|---|---|---|
| JP | 2009-236707 A | 10/2009 |
| KR | 100663525 B1 | 2/2007 |
| KR | 10-2010-0005349 A | 1/2010 |
| KR | 10-1523147 B1 | 5/2015 |

\* cited by examiner

*Primary Examiner* — Nhan T Le (57) ABSTRACT

Disclosed is a position estimation method for estimating a position of an interference signal source and a position estimation system for performing the method. The position estimation method may implement an indoor delay-space analysis structure by transmitting and receiving a known signal and a virtual array structure-based direction finding algorithm in an indoor environment in which a plurality of reflected waves is present and may increase an estimation probability for the position of the interference signal source.

20 Claims, 8 Drawing Sheets

POSITION ESTIMATION METHOD FOR ESTIMATING POSITION OF INTERFERENCE SIGNAL SOURCE AND POSITION ESTIMATION SYSTEM FOR PERFORMING THE METHOD

CROSS-REFERENCE TO RELATED APPLICATION(S)

This application claims the priority benefit of Korean Patent Application No. 10-2018-0062828 filed on May 31, 2018, and Korean Patent Application No. 10-2018-0133657 filed on Nov. 2, 2018 in the Korean Intellectual Property Office, the disclosures of which are incorporated herein by reference for all purposes.

BACKGROUND

1. Field

One or more example embodiments relate to a position estimation system and a position estimation method for estimating a position of an interference signal source, and more particularly, to a technique for estimating a position of an interference signal source in an indoor environment in which a plurality of reflected waves is present.

2. Description of Related Art

In an indoor environment, a communication system may have many factors that interfere with wireless communication due to interference by obstacles present indoors. The communication system may estimate a position of an interference signal source present indoors using a variety of methods and may cope with such interference. In general, the communication system may estimate the position of the interference signal source using a fixed array antenna structure or a super-resolution scheme, for example, a multiple signal classification (MUSIC). However, a method of using the fixed array antenna structure may be a method of using a fixed resolution, which makes it difficult to estimate the position of the interference signal source in an environment in which a plurality of reflected waves occurs due to the interference signal source. Also, the widely used super-resolution scheme may not perform an accurate position estimation since it is difficult to estimate a number of reflected waves due to a high correlation.

In recent years, a time difference arrival (TDOA) method using low-cost sensors is applied to cope with the above issues. However, the TDOA method may perform a position estimation to some extents if a bandwidth of an interference signal is wide and may not secure a time resolution if the bandwidth is small. Thus, performance degradation may occur.

Also, in the case of determining the position by receiving information of a beacon signal generator and a reception frequency or received signal strength information, or by receiving a frequency of a magnetic force signal or received signal strength information, the performance accuracy may be degraded. Thus, the above methods are generally used to assist the aforementioned position estimation systems and may not readily estimate the position of the interference signal source present indoors in reality.

Accordingly, there is a need for a method of estimating a position of an interference signal source through a method suitable for a reflected wave propagation environment in an indoor environment in which a large number of reflected waves are present.

SUMMARY

At least one example embodiment provides a position estimation method that may enhance an accuracy in estimating a position of an interference signal source using a virtual super-resolution scheme (including an algorithm) and a precise delay-space information analysis scheme in an indoor environment in which a multipath by a plurality of reflected waves is present, and a position estimation system for performing the method.

According to an aspect of at least one example embodiment, there is provided a position estimation method including extracting information of an interference signal source using an interference signal of the interference signal source detected in a propagation space; transmitting an analysis signal for delay-space analysis in the propagation space based on information of the interference signal source; receiving at least one signal occurring when the transmitted analysis signal is reflected by a structure present in the propagation space; analyzing a reflected wave structure in the propagation space using the received at least one signal; setting a variable array structure corresponding to a signal measurement environment of the propagation space based on information of the interference signal source; detecting a plurality of signals reflected in all directions of the propagation space by controlling a size of an aperture based on the variable array structure; and estimating a position of the inference signal source using the reflected wave structure and the plurality of signals reflected in all directions.

The extracting may include analyzing the interference signal detected in the propagation space and extracting information that includes a center frequency and a bandwidth of the interference signal source.

The plurality of signals reflected by the structure may be generated due to different multipaths having a delay time in a time domain.

The setting may include setting the variable array structure including a plurality of physical antennas by considering a phase of the interference signal that varies over time based on the reflected wave structure.

The plurality of physical antennas may include a single fixed antenna in the propagation space and a single antenna that moves based on a movement direction and period of an antenna determined based on information of the interference signal source, based on the fixed antenna.

The setting may include setting the variable array structure in one of a circular array form and a linear array form.

The detecting may include determining a number of virtual antennas for estimating an azimuth of a signal in the variable array structure by considering a number of reflected waves occurring in the propagation space; and controlling the size of the aperture based on the number of virtual antennas.

The detecting may include transmitting a signal in all directions of the propagation space using a plurality of physical antennas that constitutes the variable array structure, in response to the size of the aperture being controlled; and detecting at least one signal that satisfies a space gain condition of a signal among a plurality of signals in response to incidence of the plurality of signals occurring when the transmitted signal is reflected in all directions of the propagation space.

The detecting may include setting a number of multipaths that are likely to occur by a signal radiated in the signal measurement environment of the propagation space; generating an eigenvector and a noise subspace based on the set number of multipaths and a maximum number of physical antennas that constitute the variable array structure; transmitting a signal in all directions of the propagation space using the plurality of physical antennas that constitutes the variable array structure; and detecting at least one signal that satisfies an incidence condition in the eigenvector and the noise subspace in response to incidence of a plurality of signals occurring when the transmitted signal is reflected in all directions of the propagation space.

The estimating may include extracting an azimuth corresponding to each of the received plurality of signals; and estimating the position of the interference signal source by applying the extracted azimuth to a space analysis model based on the reflected wave structure.

According to another aspect of at least one example embodiment, there is provided a position estimation apparatus including a processor. The processor is configured to extract information of an interference signal source using an interference signal of the interference signal source detected in a propagation space, to transmit an analysis signal for delay-space analysis in the propagation space based on information of the interference signal source, to receive at least one signal occurring when the transmitted analysis signal is reflected by a structure present in the propagation space, to analyze a reflected wave structure in the propagation space using the received at least one signal, to set a variable array structure corresponding to a signal measurement environment of the propagation space based on information of the interference signal source, to detect a plurality of signals reflected in all directions of the propagation space by controlling a size of an aperture based on the variable array structure, and to estimate a position of the inference signal source using the reflected wave structure and the plurality of signals reflected in all directions.

The processor may be further configured to analyze the interference signal detected in the propagation space and to extract information that includes a center frequency and a bandwidth of the interference signal source.

The processor may be further configured to set the variable array structure including a plurality of physical antennas by considering a phase of the interference signal that varies over time based on the reflected wave structure.

The plurality of physical antennas may include a single fixed antenna in the propagation space and a single antenna that moves based on a movement direction and period of an antenna determined based on information of the interference signal source based on the fixed antenna.

The processor may be further configured to set the variable array structure in one of a circular array form and a linear array form based on the signal measurement environment of the propagation space.

The processor may be further configured to determine a number of virtual antennas for estimating an azimuth of a signal in the variable array structure by considering a number of reflected waves occurring in the propagation space, and to control the size of the aperture based on the number of virtual antennas.

The processor may be further configured to transmit a signal in all directions of the propagation space using a plurality of physical antennas that constitutes the variable array structure, in response to the size of the aperture being controlled, and to detect at least one signal that satisfies a space gain condition of a signal among a plurality of incident signals in response to incidence of a plurality of signals occurring when the transmitted signal is reflected in all directions of the propagation space.

The processor may be further configured to set a number of multipaths that are likely to occur by a signal radiated in the signal measurement environment of the propagation space, to generate an eigenvector and a noise subspace based on the set number of multipaths and a maximum number of physical antennas that constitutes the variable array structure, to transmit a signal in all directions of the propagation space using the plurality of physical antennas that constitutes the variable array structure, and to detect at least one signal that satisfies an incidence condition in the eigenvector and the noise subspace in response to incidence of a plurality of signals occurring when the transmitted signal is reflected in all directions of the propagation space.

The processor may be further configured to extract an azimuth corresponding to each of the received plurality of signals, and to estimate the position of the interference signal source by applying the extracted azimuth to a space analysis model based on the reflected wave structure.

According to another aspect of at least one example embodiment, there is provided a position estimation system including a plurality of antennas provided in a variable array structure in a signal measurement environment of a propagation space; and a position estimation apparatus configured to estimate a position of an interference signal source present in the propagation space using a plurality of antennas. The position estimation apparatus is configured to extract information of the interference signal source using an interference signal of the interference signal source detected in the propagation space, and analyze a reflected wave structure in the propagation space based on information of the interference signal source, to set the variable array structure adaptive to the signal measurement environment based on information of the interference signal source, and detect a plurality of signals reflected in all directions of the propagation space by controlling a size of an aperture based on the variable array structure, and to estimate a position of the inference signal source using the reflected wave structure and the plurality of signals.

According to some example embodiments, there is provided a method that may form a variable array structure using two physical sensors to outperform the issues found in a propagation environment in which reflected waves are present in an indoor space.

Also, according to some example embodiments, there is provided a virtual array structure having a different aperture size and a different number of array antennas based on frequency information of an interference signal source.

Also, according to some example embodiments, there is provided a delay-based space estimation model, for example, an angle of arrival (AOA) estimation model, for each virtual sensor by transmitting and receiving a high-speed known signal to apply an algorithm of estimating an interference signal source by a plurality of reflected waves according to improvement in a resolution function of an array antenna.

Also, according to some example embodiment, there is provided a method that may significantly enhance a position estimation accuracy in an indoor environment by acquiring azimuth information of primary received incident waves using a virtual array structure-based super-resolution scheme, by combining the acquired azimuth information and a delay-based space analysis model, and by determining a final position of an interference signal source.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the example embodiments are described with reference to the accompanying drawings. Herein, like reference numerals refer to like elements throughout. Also, in the description of embodiments, detailed description of well-known related structures or functions will be omitted when it is deemed that such description will cause ambiguous interpretation of the present disclosure.

Figure 1:
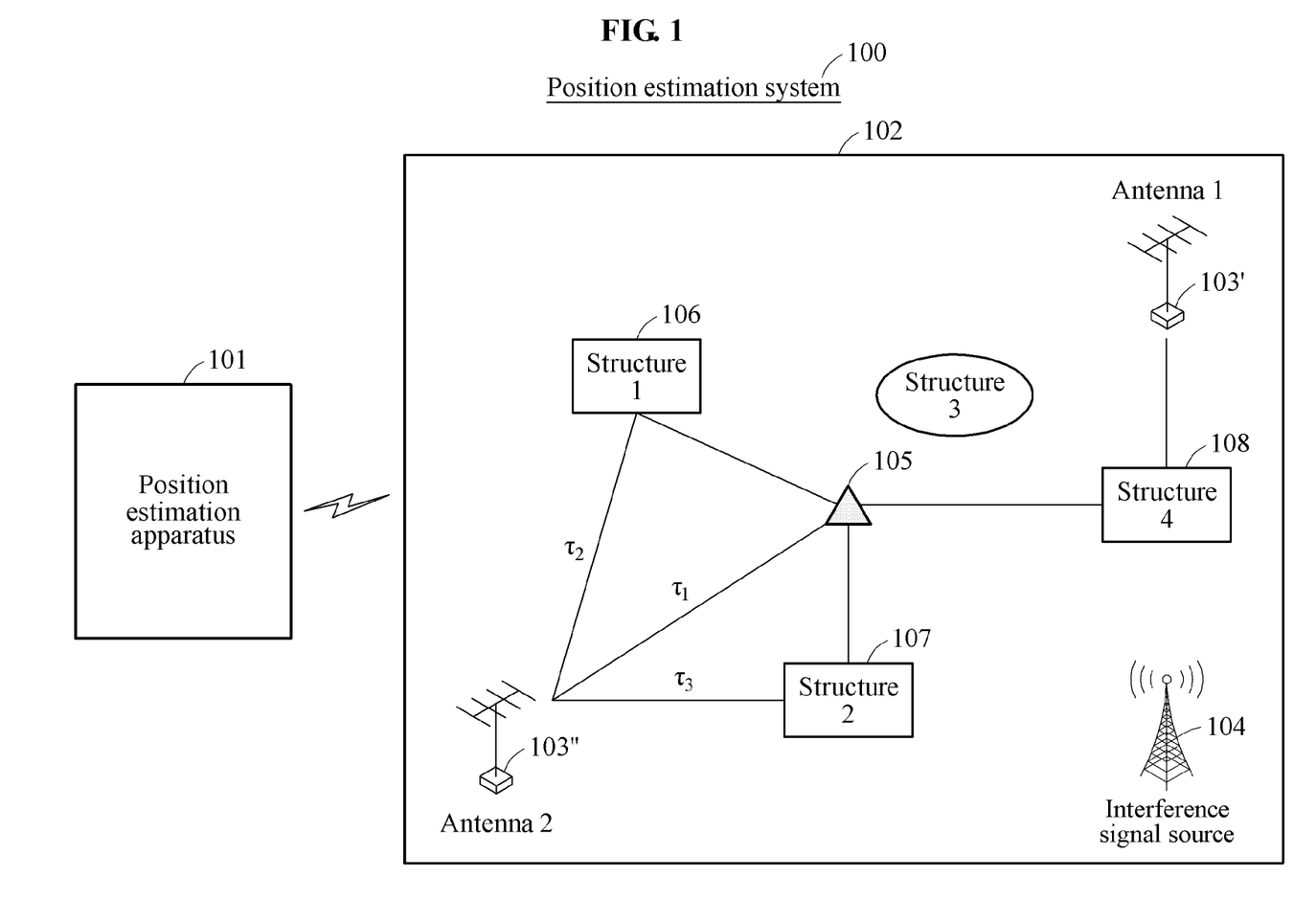
FIG. 1 illustrates an example of a position estimation system for estimating a position of an interference signal source according to an example embodiment.

FIG. 1 illustrates an example of a position estimation system for estimating a position of an interference signal source according to an example embodiment.

Referring to FIG. 1, a position estimation system 100 may estimate a position of an interference signal source 104 in an indoor environment in which a large number of reflected waves are present through a virtual super-resolution structure (including, for example, a multiple signal classification (MUSI) algorithm) and delay-space analysis. In detail, the position estimation system 100 may provide a direction finding (DF) algorithm based on a super-resolution structure suitable for the indoor environment, based on a virtual aperture and a virtual array structure of physical antennas. The position estimation system 100 may implement a precise delay-space analysis structure by transmitting and receiving the DF algorithm and a known signal 105 and may significantly enhance a probability for estimating a position of the interference signal source 104.

The position estimation system 100 may include a plurality of antennas 103' and 103" and a position estimation apparatus 101.

The plurality of antennas 103' and 103" may be disposed in a desired area within a propagation space that constitutes the indoor environment. The plurality of antennas 103' and 103" refers to physical sensors configured to increase the interference estimation accuracy of the interference signal source 104. At least two of the antennas 103' and 103" may be provided in the propagation space, in detail, as a single physical antenna fixed in the propagation space and a single physical antenna moving in the propagation space, and may also be provided in a virtual array structure suitable for an interference signal.

The position estimation apparatus 101 may receive a signal occurring in the propagation space in conjunction with the plurality of antennas 103' and 103". The position estimation apparatus 101 may estimate the position of the interference signal source 104 in the indoor environment using the received signal.

In general, a position estimation system according to the related art may perform a delay-space analysis based on a propagation environment of an indoor space and may generate a reflector physical model of the indoor space based on a result of performing the delay-space analysis. The position estimation system according to the related art may analyze a result of performing a DF algorithm and a plurality of paths through a physical antenna and may estimate a position of the interference signal source 104 as a virtual array system. That is, the position of the interference signal source 104 may be estimated using only an azimuth of a reflected wave by limiting a setting of a space band based on a number of physical antennas. However, estimating the position of the interference signal source 104 using only the azimuth of the reflected wave based on space power in the indoor environment makes it difficult to estimate a final position of the interference signal source 104.

According to an example embodiment, the position estimation apparatus 101 may receive an interference signal of the interference signal source 104 occurring in the propagation space of the indoor environment and may determine a frequency and a bandwidth of the received interference signal. The position estimation apparatus 101 may receive an analysis signal, for example, a pseudo-name (PN) code, for precise delay-space analysis, and may analyze an indoor reflected wave structure using the analysis signal and the known signal 105. Here, the indoor reflected wave structure may indicate an arrangement configuration of elements that are reflected by structures 106, 107, and 108 present within the propagation space.

The position estimation apparatus 101 may appropriately control a size of a virtual aperture based on the analyzed indoor reflected wave structure and may determine a DF algorithm suitable for the indoor environment using the plurality of antennas 103' and 103" and the virtual array structure. Here, the DF algorithm refers to an algorithm that determines an azimuth of a path having great space power in the indoor environment in which may reflected waves are present as a super-resolution beamforming. The position estimation apparatus 101 may acquire an incidence azimuth value over the entire delay time by executing an angle of arrival (AOA) algorithm based on the delay time.

The position estimation apparatus 101 may perform delay-space analysis using the DF algorithm in the super-resolution structure and the known signal 105 in the indoor environment and may estimate the position of the interference signal source 104 of which accuracy is improved.

The position estimation apparatus 101 proposed herein enables an existing space band setting function to be variable, and may estimate a position of the interference signal source 104 in various environments as well as in the propagation space of the indoor environment. Also, the position estimation apparatus 101 may simultaneously use the plurality of physical antennas 103' and 103" in the door environment to estimate the position of the interference signal source 104. Thus, an infinite number of virtual sensors may be configured based on a frequency band.

The position estimation apparatus 101 may adaptively improve the performance of a monitoring system at low cost in the indoor environment, may cancel interference in a space, and may be effectively applied to a general mobile communication method, for example, a frequency division multiple access (FDMA) communication method.

Figure 2:
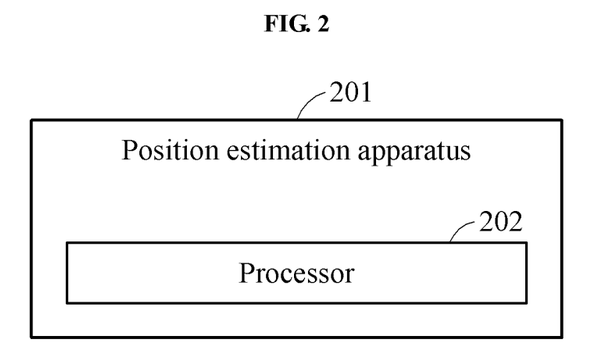
FIG. 2 is a diagram illustrating an example of a configuration of a position estimation apparatus according to an example embodiment.

FIG. 2 is a diagram illustrating an example of a configuration of a position estimation apparatus according to an example embodiment.

Referring to FIG. 2, a position estimation apparatus 201 may include a processor 202, and may estimate a position of an interference signal source in an indoor environment in which a large number of reflected waves are present using a super-resolution-based DF algorithm and precise delay-space analysis, through the processor 202.

The position estimation apparatus 201 may extract information of the interference signal source using an interference signal of the interference signal source detected in the propagation space. In detail, the position estimation apparatus 101 may receive the interference signal of the interference signal source in the propagation space of the indoor environment. The position estimation apparatus 201 may analyze the interference signal detected in the propagation space and may extract information including a center frequency and a bandwidth of the interference signal source.

The position estimation apparatus 201 may transmit an analysis signal for delay-space analysis in the propagation space based on information of the interference signal source. The position estimation apparatus 101 may receive at least one signal occurring when the transmitted analysis signal is reflected by a structure present in the propagation space. That is, a plurality of signals reflected by the structure may be signals that occur due to different multipaths each having a delay time in a time domain. Here, the position estimation apparatus 201 may repeatedly and sequentially transmit and receive the known signal using corresponding two physical antennas and about three virtual antennas.

The position estimation apparatus 201 may analyze a reflected wave structure in the propagation space using the received at least one signal. The position estimation apparatus 201 may set a variable array structure corresponding to a signal measurement environment of the propagation space based on information of the interference signal source. In detail, the position estimation apparatus 201 may set the variable array structure including a plurality of physical antennas based on a phase of the interference signal that varies over time based on the reflected wave structure.

The plurality of physical antennas may include two physical sensors to increase the accuracy of interference estimation. The plurality of physical antennas may include a single fixed physical antenna in the propagation space and a single physical antenna that moves in the propagation space. That is, the plurality of physical antennas may include two antennas, that is, a single antenna fixed in the propagation space and a single antenna that moves based on a movement direction and period of an antenna determined based on information of the interference signal source, based on the fixed single antenna.

The position estimation apparatus 201 may set the variable array structure in one of a circular array form and a linear array form, using the plurality of physical antennas.

The position estimation apparatus 201 may detect a plurality of signals reflected in all directions of the propagation space by controlling the size of the aperture based on the variable array structure. The position estimation apparatus 201 may determine a number of virtual antennas to estimate an azimuth of a signal in the variable array structure based on a number of reflected waves occurring in the propagation space. The position estimation apparatus 201 may control the size of the aperture based on the number of virtual antennas.

Once the size of the aperture is controlled, the position estimation apparatus 201 may transmit a signal in all directions of the propagation space using the plurality of physical antennas that constitutes the variable array structure. In detail, the position estimation apparatus 201 may set a number of multipaths that may occur by a signal radiated in a signal measurement environment of the propagation space. The position estimation apparatus 201 may generate an eigenvector and a noise subspace based on the set number of multipaths and a maximum number of physical antennas that constitute the variable array structure. The position estimation apparatus 201 may transmit a signal in all directions of the propagation space using the plurality of physical antennas that constitute the variable array structure.

As the transmitted signal is reflected in all directions of the propagation space, a plurality of signals may occur and be incident. Herein, the plurality of signals may also be represented as the plurality of signals reflected in all directions of the propagation space.

Once the plurality of signals is incident, the position estimation apparatus 201 may detect at least one signal that satisfies a space gain condition of a signal among the plurality of incident signals. The position estimation apparatus 201 may detect at least one signal that satisfies an incidence condition in the eigenvector and the noise subspace.

The position estimation apparatus 201 may estimate a position of the interference signal source based on the reflected wave structure and the plurality of signals reflected in all directions of the propagation space. The position estimation apparatus 201 may extract an azimuth corresponding to each of the received signals. The position estimation apparatus 201 may estimate the position of the interference signal source by applying the extracted azimuth to a space analysis model based on the reflected wave structure.

The position estimation apparatus 201 may estimate a final position of the interference signal source by combining a time domain DF algorithm estimation result and a result of applying the space analysis model based on azimuth information extracted in a delay area.

Figure 3:
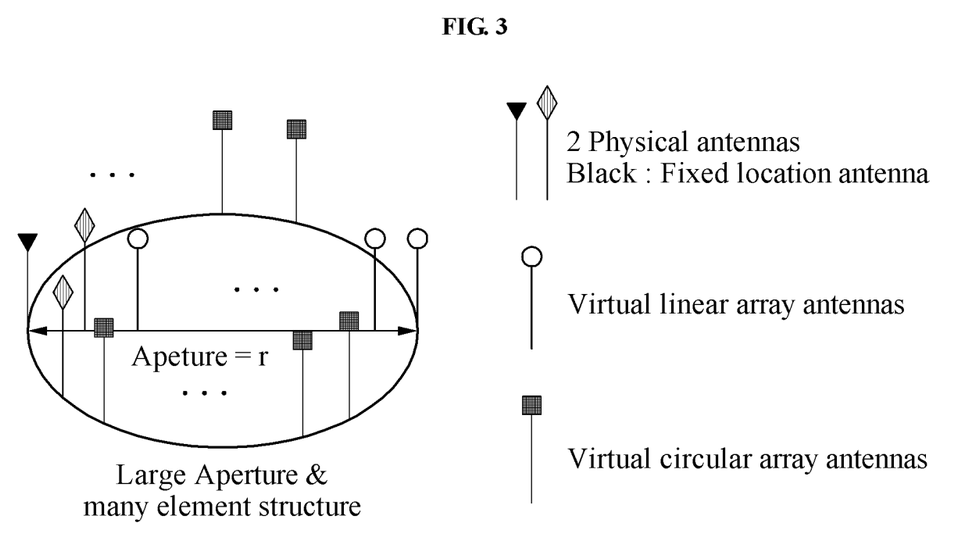
FIG. 3 illustrates an example of a virtual array structure according to an example embodiment.

FIG. 3 illustrates an example of a virtual array structure according to an example embodiment.

Referring to FIG. 3, the position estimation apparatus 201 may determine a super-resolution-based DF algorithm using two physical antennas and a plurality of virtual sensors.

In detail, the position estimation apparatus 201 may include two physical antennas. Here, in the case of using a single physical antenna, information of an interference signal having a bandwidth varies over time and accordingly, a phase received at virtual sensors may vary over time. Therefore, the position estimation apparatus 201 may not estimate the position of the interference signal source. According to an example embodiment, the position estimation apparatus 201 may configure a virtual sensor array using two physical antennas, for example, by fixing a single physical antenna in the propagation space and using the other single physical antenna.

According to an example embodiment, information of the interference signal output from the interference signal source may be removed and only phase information may be acquired at each virtual sensor corresponding to a single physical antenna that moves in the propagation space according to the following Equation 1.

$$F = \frac{y_{1,i}(t)}{y_{2,i}(t)} = \exp\left(j2\pi\left(\frac{r}{\lambda_c}\cos(\theta - wt)\right)\right) + n_i(t) \quad \text{[Equation 1]}$$

In Equation 1, $y_{1,i}(t)$ denotes a received signal that is input from the physical antenna, for example, antenna 1, fixed in the propagation space and $y_{2,i}(t)$ denotes a received signal that is input through virtual sensors using the physical antenna, for example, antenna 2, moving in the propagation space. The position estimation apparatus 201 may set the virtual array structure in the circular array form or the linear array form based on a user measurement environment.

Figure 4:
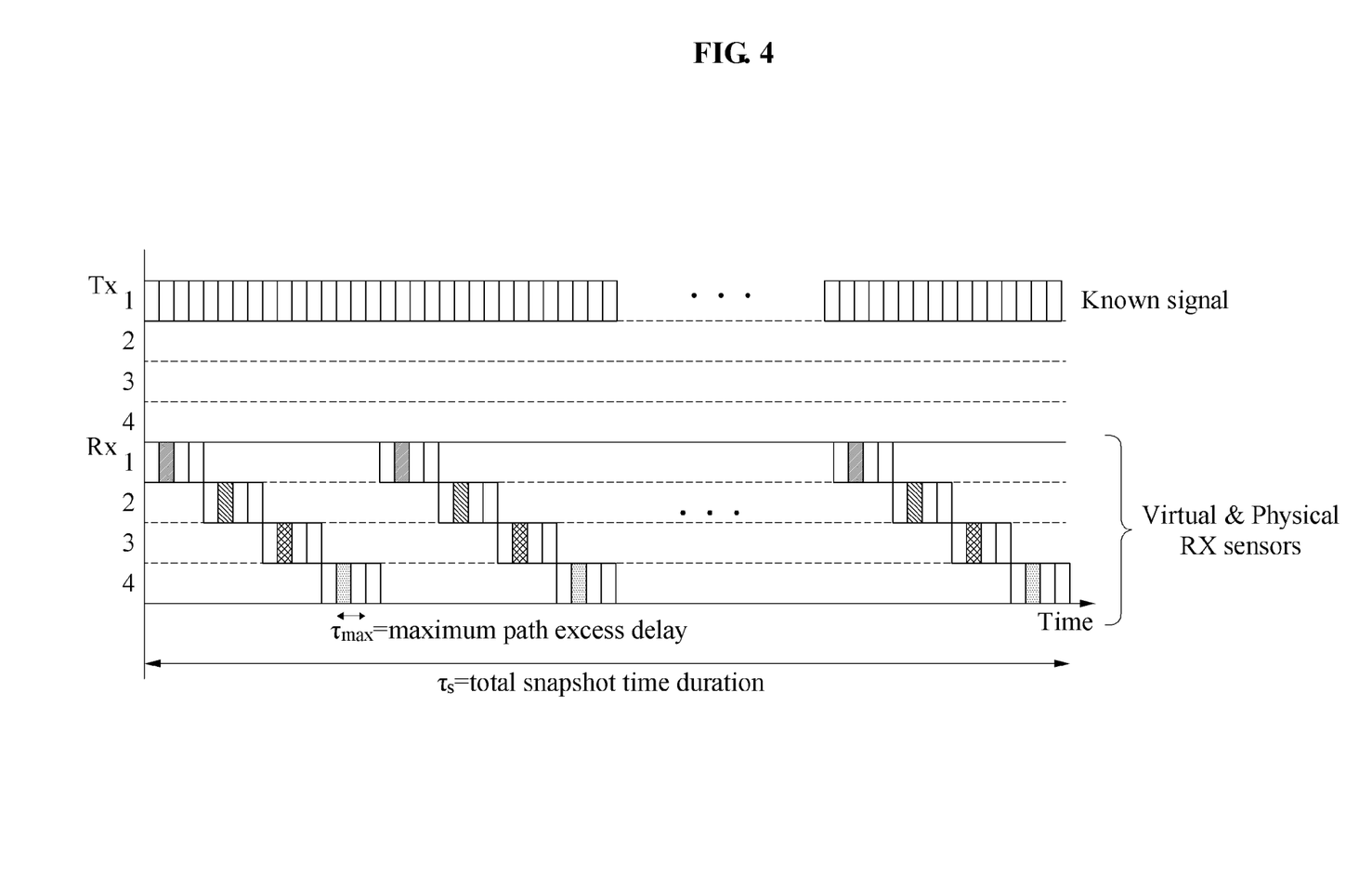
FIG. 4 illustrates an example of a transmission/reception structure through a delay-space analysis in a propagation space of an indoor environment according to an example embodiment.

FIG. 4 illustrates an example of a transmission/reception structure through a delay-space analysis in a propagation space of an indoor environment according to an example embodiment.

Referring to a graph of FIG. 4, it is possible to propose a method of generating a delay-based space model by transmitting a known signal and a delay-space analysis result. In detail, the graph shows a result of analyzing the propagation space of the indoor environment using an AOA algorithm based on a delay time. It is possible to extract a result based on a signal transmitted at a high rate and a precise delay time. Accordingly, it is possible to solve a multipath issue resulting from a high correlation and to estimate a further accurate position of a structure within the propagation space.

Figure 5A:
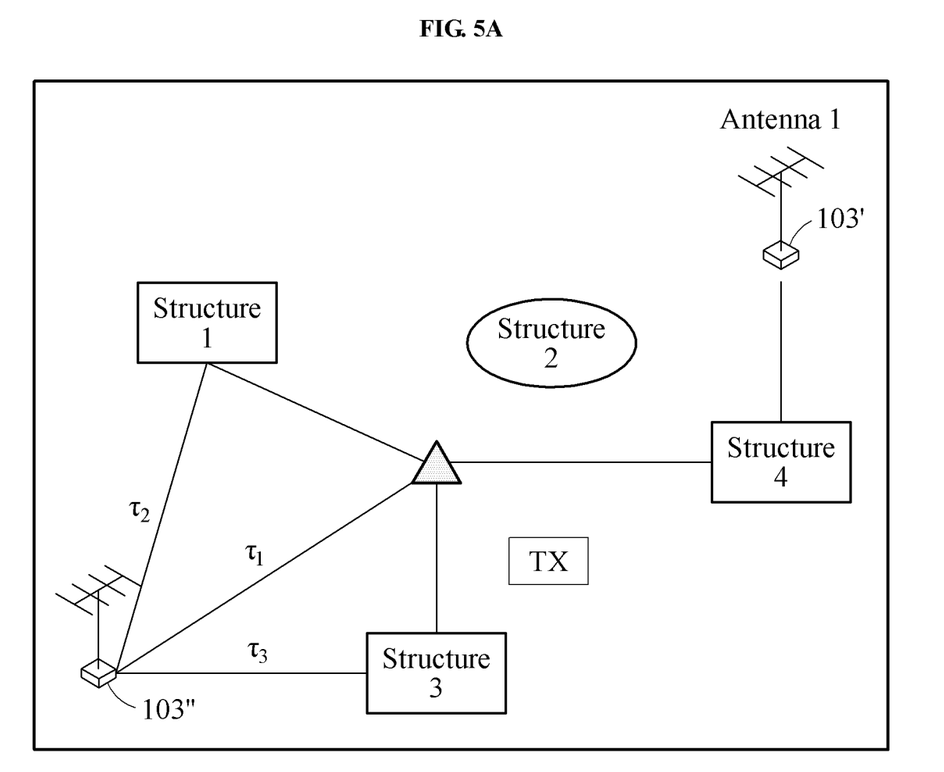
FIGS. 5A and 5B illustrate an example of a process of detecting a signal through a delay-space analysis in a propagation space of an indoor environment according to an example embodiment.
Figure 5B:
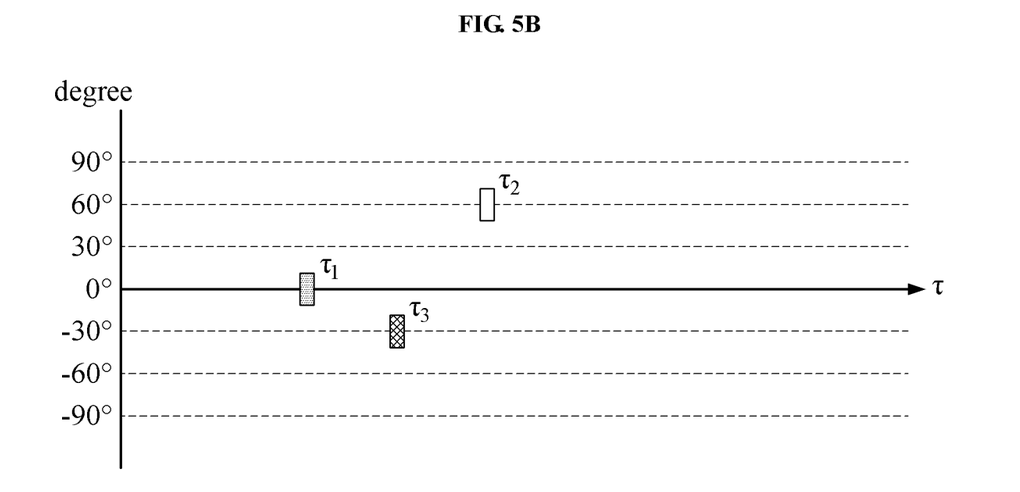

FIGS. 5A and 5B illustrates an example of a process of detecting a signal through a delay-space analysis in a propagation space of an indoor environment according to an example embodiment.

A graph of FIG. 5B shows a result of integrating an AOA result in a precise delay time domain. Also, the graph may be used as a reference material from a result of using a DF algorithm proposed herein and may be applied to an artificial intelligence (AI) algorithm-based position estimation method.

Referring to the graph, in a path 2, an incident wave with a delay of $\tau\_2$ was reflected by structure 1 located at 60° and received from a center transmitter. In a path 1, an incident wave with a delay of $\tau\_1$ was received at 0° from the transmitter. In a path 3, an incident wave with a delay of $\tau\_3$ was reflected by structure 3 located at −30° and received.

The position estimation apparatus may acquire position information of structures, for example, reflectors, in the propagation space of the indoor environment by combining delay-space analysis results.

Figure 6A:
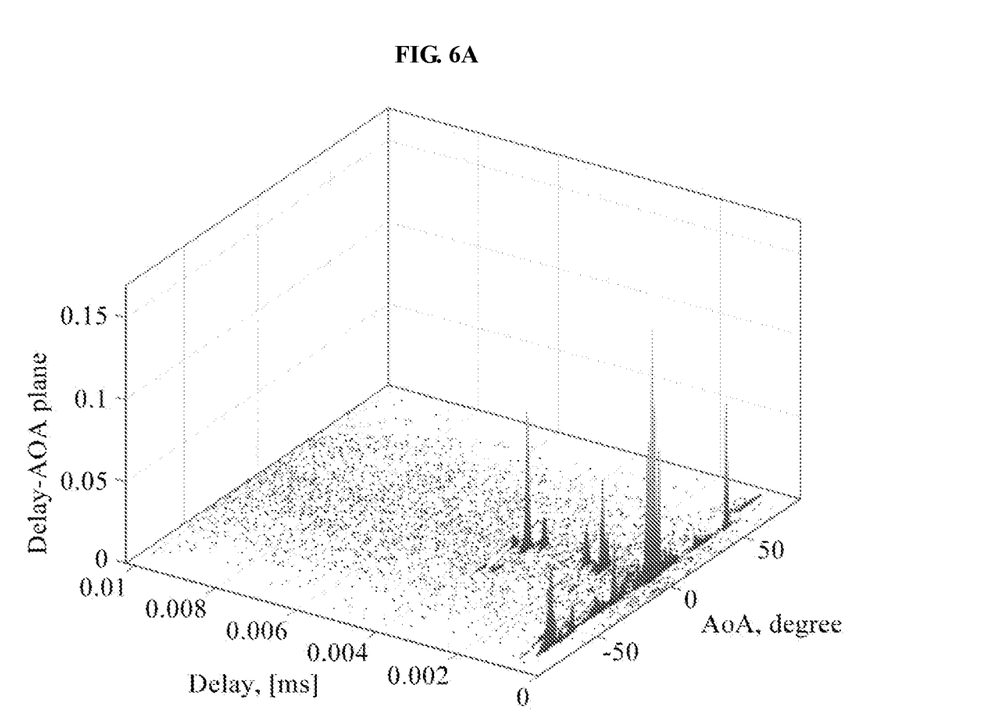
FIGS. 6A and 6B are graphs showing a result of performing a delay-space analysis in a propagation space of an indoor environment according to an example embodiment.
Figure 6B:
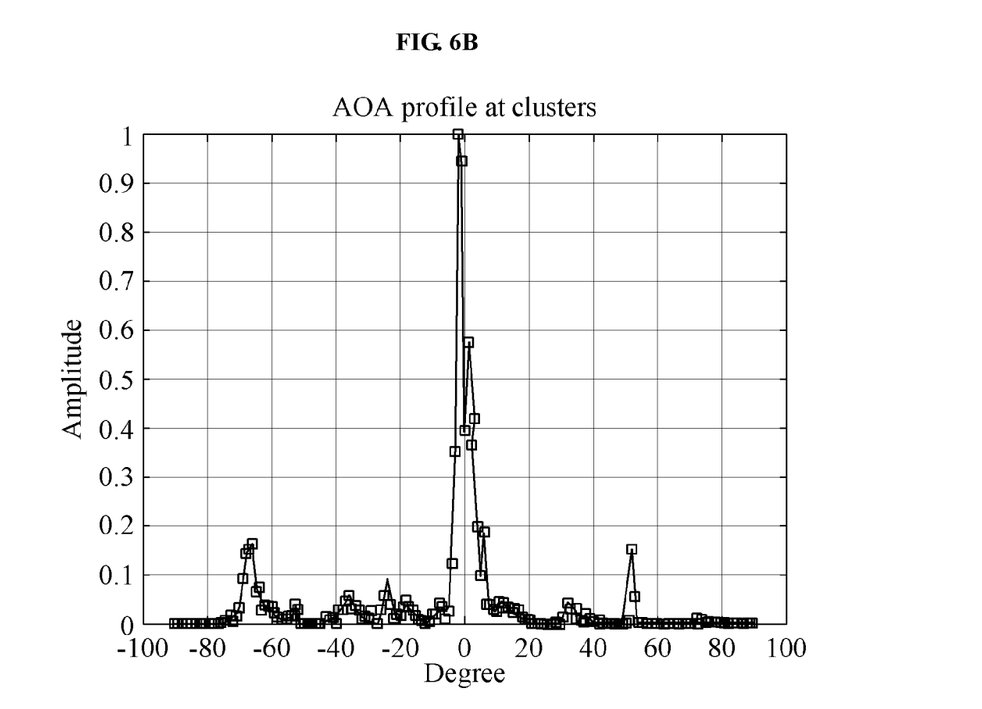

FIGS. 6A and 6B are graphs showing examples of a result of performing a delay-space analysis in a propagation space of an indoor environment according to an example embodiment.

Referring to FIG. 6A, the graph shows a result of estimating an azimuth of a known signal in a delay-time domain. Referring to FIG. 6B, the graph shows a result of averaging reflected wave delay-AOA result of a repeatedly transmitted signal. The graphs may show an ideal azimuth result to be substantially estimated in a time domain.

Figure 7A:
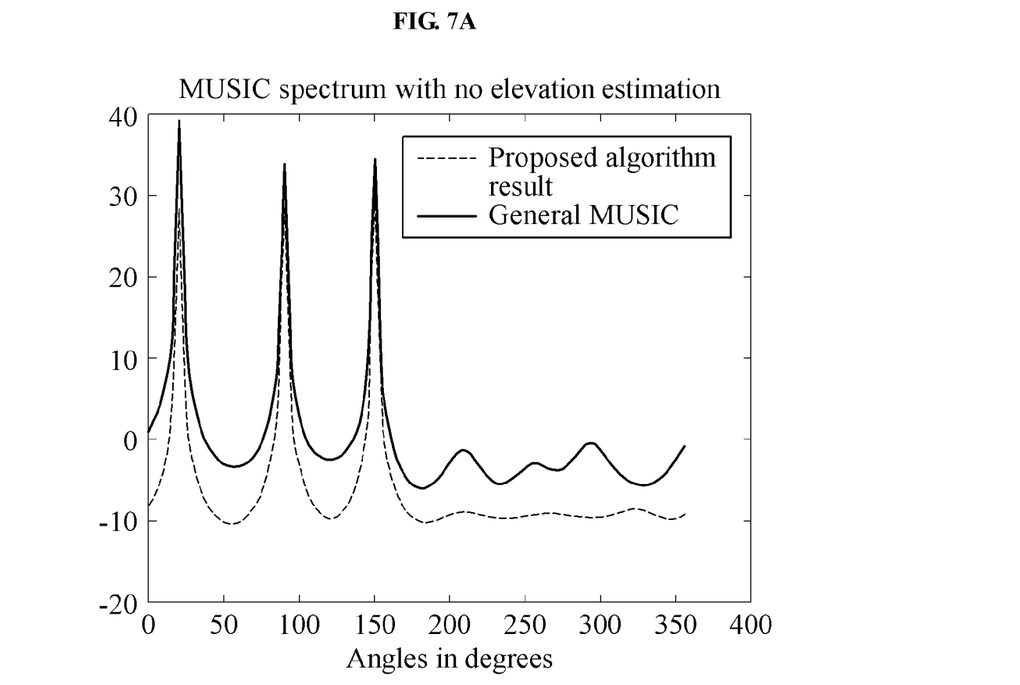
FIGS. 7A and 7B are graphs showing a process of detecting a signal through a variable array structure using a virtual antenna according to an example embodiment.
Figure 7B:
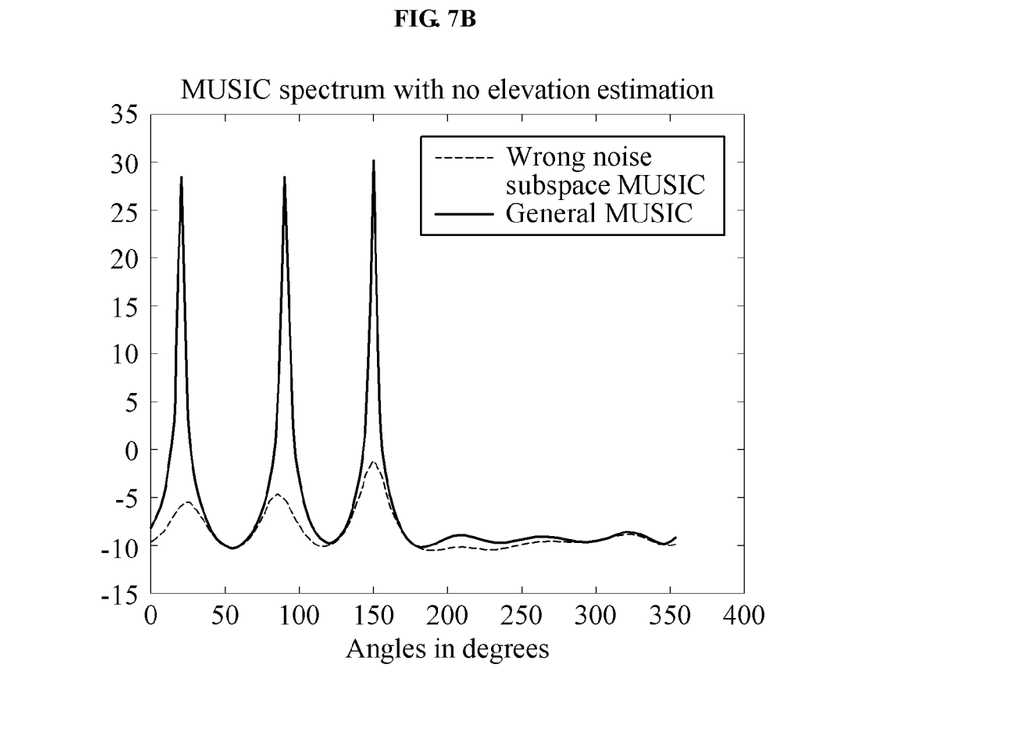

FIGS. 7A and 7B are graphs showing examples of a process of detecting a signal through a variable array structure using a virtual antenna according to an example embodiment.

A position estimation method performed by a position estimation apparatus according to an example embodiment may implement various aperture sizes and a plurality of virtual sensors based on information of an interference signal source using two physical antennas. The position estimation method may set a virtual variable array structure using a super-resolution-based DF algorithm and may perform a MUSIC algorithm in which noise subspace is configured using about three lower eigenvectors.

The position estimation method may acquire an accurate reception direction for multipaths and then may transmit a signal at a high rate and may perform the delay-space analysis in the same variable array structure. In this manner, information of a structure in the propagation space of the indoor environment may be acquired. Further, when two or more multipaths are estimable, the position estimation method may estimate a position of an interference signal source in a single position estimation system.

Accordingly, the proposed method herein may generate virtual sensors using a single fixed physical antenna and a remaining single mobile physical antenna and may estimate a position of an interference signal source. In the case of using the proposed method, a number of position estimation systems required may be reduced to be 1 that is ⅓ compared to 3 that is a number of position estimation apparatuses required in the related art. Also, a number of antennas may be significantly reduced using a physical antenna and a space resolution may be excellent. Accordingly, the position estimation system proposed herein may be significantly excellent in terms of price and system performance.

Referring to FIG. 7A, the graph shows a result of performing each algorithm with the assumption that a plurality of physical antennas has a total of 11 arrays with respect to three multipaths and 100% correlation signals and three incident signals are present. Referring to FIG. 7B, the graph shows an extraction result using a general MUSIC scheme and a result of performing a proposed algorithm in which 9:11 of eigenvector is regarded as noise subspace vectors.

Comparing the two graphs, the proposed method does not use sufficient noise-sub space (using 4:11 eigenvectors) and thus shows a slight decrease in terms of gain and ambiguity. On the contrary, when a number of incident signals is erroneously estimated, which frequently occurs in a MUSIC algorithm in a general indoor environment, the performance is significantly degraded and thus may be barely available.

However, the proposed method may perform an accurate position estimation regardless of a slight degradation in the performance.

Accordingly, due to a characteristic of a high correlated multipath signal, it is difficult to accurately estimate a number of incident signals using an eigen decomposition method. Therefore, it is possible to secure a sufficient number of sensors and an aperture size using the virtual array and to configure an appropriate number of noise subspace vectors until the number of noise subspace vectors reaches an appropriate number, for example, three or four, inversely starting from a total number of sensors.

Figure 8:
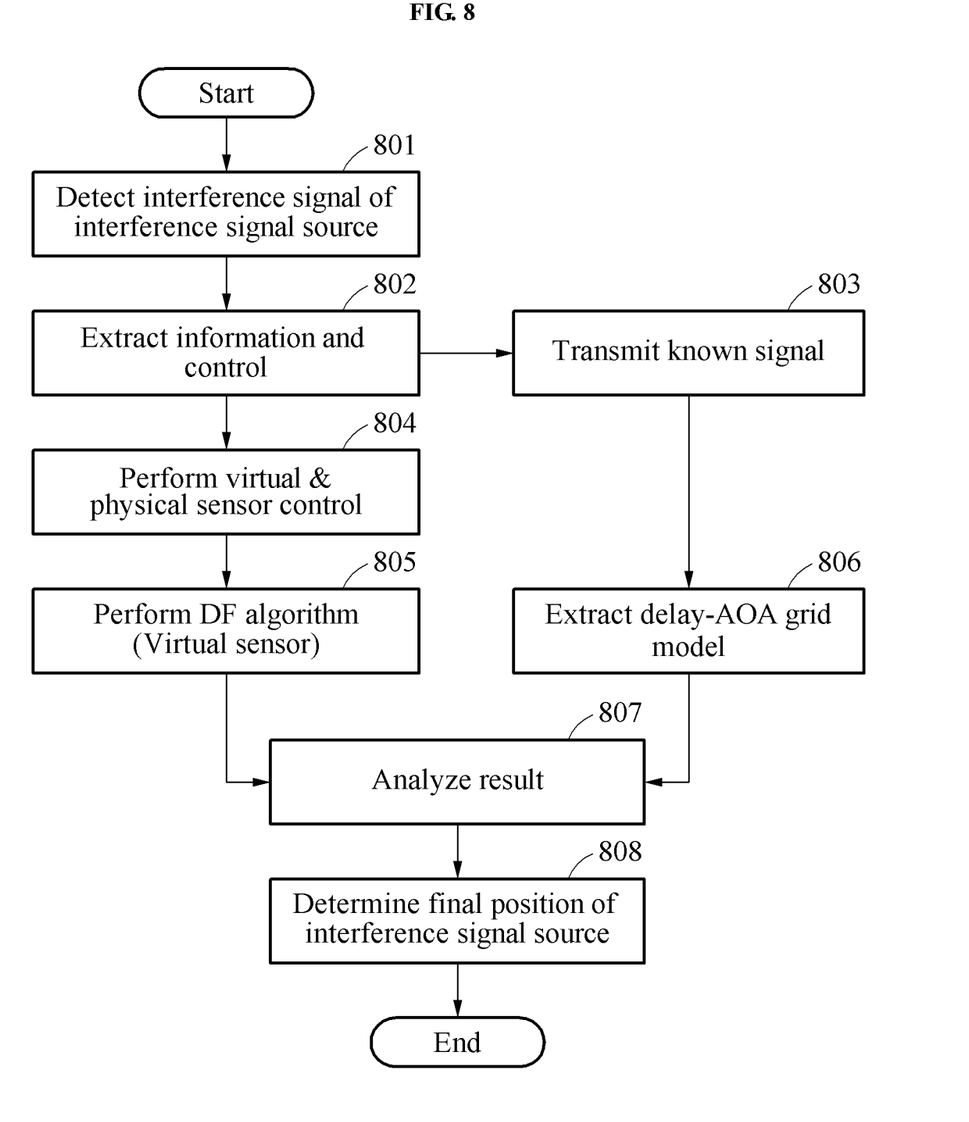
FIG. 8 is a flowchart illustrating an example of a position estimation method according to an example embodiment.

FIG. 8 is a flowchart illustrating an example of a position estimation method according to an example embodiment.

Referring to FIG. 8, in operation 801, a position estimation apparatus may detect an interference signal of an interference signal source in a propagation space of an indoor environment.

In operation 802, the position estimation apparatus may extract a center frequency and a bandwidth of the interference signal using the interference signal of the interference signal source.

In operation 803, the position estimation apparatus may receive a known signal in the indoor environment.

In operation 804, once the center frequency and the bandwidth of the interference signal are extracted, the position estimation apparatus may control a size of an aperture and a number of virtual physical antennas based on information of the interference signal source. The position estimation apparatus may select an array form and determine a movement direction and period of moves by controlling the size of the aperture and the number of virtual physical antennas. According to an example embodiment, when estimating a position of the interference signal source in the propagation space of the indoor environment, a number of sensors may ideally increase according to an increase in the size of the aperture. In this case, a resolution may become dense and the position estimation accuracy may be improved when performing a DF algorithm, such as beamforming. Here, it may be significantly difficult and less important to estimate a position of a signal source with respect to all the paths directly in the indoor environment in which a plurality of multipaths is present.

In operation 805, a signal corresponding to a multipath may be incident to the position estimation apparatus. Initially, the position estimation apparatus may preferentially and accurately estimate an incident direction of a path having relatively great power in a desired area of the propagation space. That is, the position estimation apparatus may determine the DF algorithm to estimate a path having relatively great power in propagation space, instead of estimating a direction in every path of the propagation space. The position estimation apparatus may set a variable array structure including the plurality of physical antennas.

The position estimation apparatus may control the virtual array structure and then perform the virtual sensor-based DF algorithm. Here, the position estimation apparatus may apply the DF algorithm to the following two schemes.

1) Beamforming Scheme:

The position estimation apparatus may determine the beamforming scheme using the DF algorithm. The beamforming scheme may project a response of an array including a plurality of virtual antennas in all directions of the propagation space and extract a path having two or three directions in which a space gain is largest.

2) Super Resolution Scheme:

The position estimation apparatus may determine the super-resolution scheme using the DF algorithm. Here, the super-resolution scheme may perform a MUSIC algorithm using noise eigenvectors that are verifiable as a noise subspace. The super-resolution scheme may extract a path h having two or three directions in which a space gain is largest in all directions of the space as a result of performing the MUSIC algorithm.

In general, in the MUSIC algorithm, a covariance matrix rank decreases compared to all the incident direction vectors in an environment in which a large number of high-correlated reflected waves are present. Thus, a configuration of noise subspace vectors may be inaccurate. Also, the MUSIC algorithm may fail to estimate azimuths of incident waves if the number of antennas increases.

Accordingly, the proposed position estimation apparatus may secure a sufficient number, for example, K, of virtual antennas using a virtual array structure. The position estimation apparatus may implement a noise subspace with eigenvectors of which a number is between N+1: element (maximum number K), based on the number, for example, N, of multipaths that may occur in the general propagation space of the indoor environment. The position estimation apparatus may determine a response having a shortest value as a response of an incident signal based on a virtual array response manifold.

In operation 806, the position estimation apparatus may accurately estimate only a direction in which a signal having relatively great space power is incident by performing the algorithm using the virtual array structure. Accordingly, the position estimation apparatus may use a transmission of a known signal to estimate an accurate position of an interference signal source including reflected waves and to estimate a delay time-based AOA for analyzing the propagation space of the indoor environment.

To calculate a delay time $\tau$ in which a resolution is high, the position estimation apparatus may repeatedly transmit a high speed signal, for example, a PN-code, based on a transmission/reception structure for delay-space analysis as shown in FIG. 4.

In general, to acquire a high resolution with respect to a delay time, a bandwidth of 50 MHz or more is required. In this case, a time delay resolution may be acquired per 10 ns. Also, when a direction estimation is performed based on the time delay resolution, many multipath signals may simultaneously occur in a delay time domain. However, an accurate result may be extracted using the general DF algorithm based on a basic unit of the delay time domain. For example, since a minority number of (less than 1) signal is assumed to be received, a multipath signal may include various paths having different delay times.

However, in the indoor environment, it is difficult to resolve the interference signal source in the delay time domain. Application to the indoor environment is difficult. The delay time resolution may be important to analyze the propagation space of the indoor environment and may be used as a reference material.

In operation 807, the position estimation apparatus may compare paths in the structural propagation space of the indoor environment based on results received in operation 805 and in operation 806.

In operation 808, the position estimation apparatus may estimate a final position of the interference signal source based on a result of comparing the paths.

Figure 9:
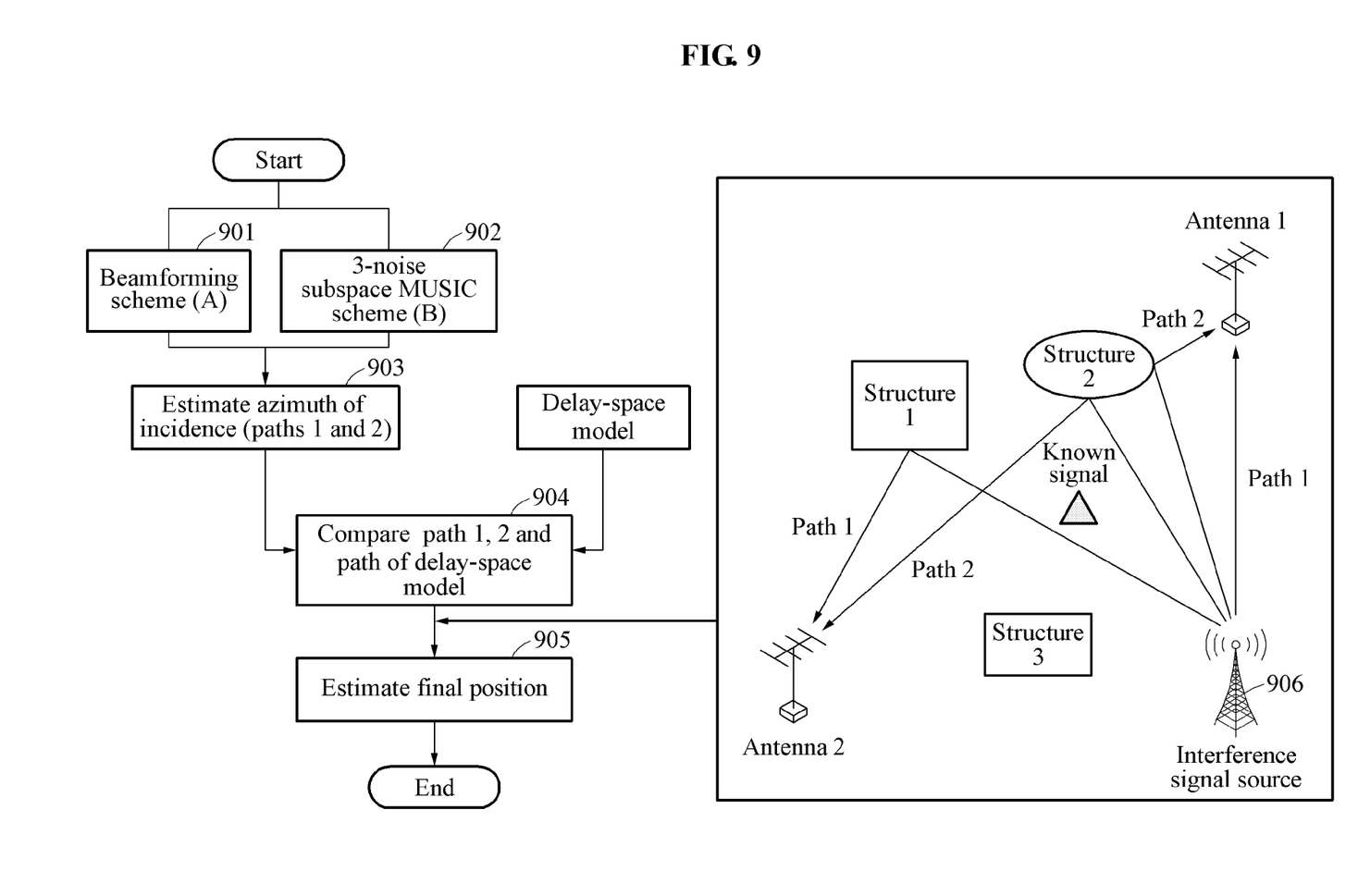
FIG. 9 is a flowchart illustrating an example of a process of estimating a final position of an interference signal source according to an example embodiment.

FIG. 9 is a flowchart illustrating an example of a process of estimating a final position of an interference signal source according to an example embodiment.

A position estimation apparatus proposed herein may extract a final position of an interference signal source by improving a delay-based space model analysis result and a resolution and by combining a proposed position estimation algorithm result. Here, the position estimation apparatus may control a virtual array structure and then perform a DF algorithm through two schemes based on a virtual sensor.

Referring to FIG. 9, in operation 901, the position estimation apparatus may apply the DF algorithm using a beamforming scheme based on a virtual array antenna structure.

In operation 902, the position estimation apparatus may apply the DF algorithm using a 3-noise subspace MUSIC scheme based on the virtual array antenna structure.

In operation 903, the position estimation apparatus may estimate an azimuth of incidence with respect to two or three paths having great space power in a corresponding direction through operations 901 and 902. The position estimation apparatus may compare a result about the estimated azimuth of incidence and a result of analyzing a delay space model structure and may estimate a final position of the interference signal source.

In operation 904, the position estimation apparatus may estimate azimuths of two paths at 20° and 10° based on the result of estimating the position of the interference signal source using the proposed DF algorithm in the propagation space of the indoor environment. The position estimation apparatus may form a path 1-1 (path 1) and a path 2-2 (path 2) using a reflected wave structure through a result of applying the DF algorithm and the delay-space analysis model.

In operation 905, the position estimation apparatus may accurately estimate the position of the interference signal source. The position estimation apparatus may estimate the final position of the interference signal source by combining the result of estimating the azimuth of the path having the great space power and the delay-space analysis result.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A position estimation method comprising:
   extracting information of an interference signal source using an interference signal of the interference signal source detected in a propagation space;
   transmitting an analysis signal for delay-space analysis in the propagation space based on information of the interference signal source;
   receiving at least one signal occurring when the transmitted analysis signal is reflected by a structure present in the propagation space;
   analyzing a reflected wave structure in the propagation space using the received at least one signal;
   setting a variable array structure corresponding to a signal measurement environment of the propagation space based on information of the interference signal source;
   detecting a plurality of signals reflected in all directions of the propagation space by controlling a size of an aperture based on the variable array structure; and
   estimating a position of the inference signal source using the reflected wave structure and the plurality of signals reflected in all directions.

2. The method of claim 1, wherein the extracting comprises analyzing the interference signal detected in the propagation space and extracting information that includes a center frequency and a bandwidth of the interference signal source.

3. The method of claim 1, wherein the plurality of signals reflected by the structure is generated due to different multipaths having a delay time in a time domain.

4. The method of claim 1, wherein the setting comprises setting the variable array structure including a plurality of physical antennas by considering a phase of the interference signal that varies over time based on the reflected wave structure.

5. The method of claim 4, wherein the plurality of physical antennas comprises a single fixed antenna in the propagation space and a single antenna that moves based on a movement direction and period of an antenna determined based on information of the interference signal source, based on the fixed antenna.

6. The method of claim 1, wherein the setting comprises setting the variable array structure in one of a circular array form and a linear array form.

7. The method of claim 1, wherein the detecting comprises:
   determining a number of virtual antennas for estimating an azimuth of a signal in the variable array structure by considering a number of reflected waves occurring in the propagation space; and
   controlling the size of the aperture based on the number of virtual antennas.

8. The method of claim 1, wherein the detecting comprises:
   transmitting a signal in all directions of the propagation space using a plurality of physical antennas that constitutes the variable array structure, in response to the size of the aperture being controlled; and
   detecting at least one signal that satisfies a space gain condition of a signal among a plurality of signals in response to incidence of the plurality of signals occurring when the transmitted signal is reflected in all directions of the propagation space.

9. The method of claim 1, wherein the detecting comprises:
   setting a number of multipaths that are likely to occur by a signal radiated in the signal measurement environment of the propagation space;
   generating an eigenvector and a noise subspace based on the set number of multipaths and a maximum number of physical antennas that constitute the variable array structure;
   transmitting a signal in all directions of the propagation space using the plurality of physical antennas that constitutes the variable array structure; and
   detecting at least one signal that satisfies an incidence condition in the eigenvector and the noise subspace in response to incidence of a plurality of signals occurring when the transmitted signal is reflected in all directions of the propagation space.

10. The method of claim 1, wherein the estimating comprises:
    extracting an azimuth corresponding to each of the received plurality of signals; and
    estimating the position of the interference signal source by applying the extracted azimuth to a space analysis model based on the reflected wave structure.

11. A position estimation apparatus comprising:
    a processor,
    wherein the processor is configured to extract information of an interference signal source using an interference signal of the interference signal source detected in a propagation space, to transmit an analysis signal for delay-space analysis in the propagation space based on information of the interference signal source, to receive at least one signal occurring when the transmitted analysis signal is reflected by a structure present in the propagation space, to analyze a reflected wave structure in the propagation space using the received at least one signal, to set a variable array structure corresponding to a signal measurement environment of the propagation space based on information of the interference signal source, to detect a plurality of signals reflected in all directions of the propagation space by controlling a size of an aperture based on the variable array structure, and to estimate a position of the inference signal source using the reflected wave structure and the plurality of signals reflected in all directions.

12. The position estimation apparatus of claim 11, wherein the processor is further configured to analyze the interference signal detected in the propagation space and to extract information that includes a center frequency and a bandwidth of the interference signal source.

13. The position estimation apparatus of claim 11, wherein the processor is further configured to set the variable array structure including a plurality of physical antennas by considering a phase of the interference signal that varies over time based on the reflected wave structure.

14. The position estimation apparatus of claim 13, wherein the plurality of physical antennas comprises a single fixed antenna in the propagation space and a single antenna that moves based on a movement direction and period of an antenna determined based on information of the interference signal source based on the fixed antenna.

15. The position estimation apparatus of claim 11, wherein the processor is further configured to set the variable array structure in one of a circular array form and a linear array form based on the signal measurement environment of the propagation space.

16. The position estimation apparatus of claim 11, wherein the processor is further configured to determine a number of virtual antennas for estimating an azimuth of a signal in the variable array structure by considering a number of reflected waves occurring in the propagation space, and to control the size of the aperture based on the number of virtual antennas.

17. The position estimation apparatus of claim 11, wherein the processor is further configured to transmit a signal in all directions of the propagation space using a plurality of physical antennas that constitutes the variable array structure, in response to the size of the aperture being controlled, and to detect at least one signal that satisfies a space gain condition of a signal among a plurality of incident signals in response to incidence of a plurality of signals occurring when the transmitted signal is reflected in all directions of the propagation space.

18. The position estimation apparatus of claim 11, wherein the processor is further configured to set a number of multipaths that are likely to occur by a signal radiated in the signal measurement environment of the propagation space, to generate an eigenvector and a noise subspace based on the set number of multipaths and a maximum number of physical antennas that constitutes the variable array structure, to transmit a signal in all directions of the propagation space using the plurality of physical antennas that constitutes the variable array structure, and to detect at least one signal that satisfies an incidence condition in the eigenvector and the noise subspace in response to incidence of a plurality of signals occurring when the transmitted signal is reflected in all directions of the propagation space.

19. The position estimation apparatus of claim 11, wherein the processor is further configured to extract an azimuth corresponding to each of the received plurality of signals, and to estimate the position of the interference signal source by applying the extracted azimuth to a space analysis model based on the reflected wave structure.

20. A position estimation system comprising:
  a plurality of antennas provided in a variable array structure in a signal measurement environment of a propagation space; and
  a position estimation apparatus configured to estimate a position of an interference signal source present in the propagation space using a plurality of antennas,
  wherein the position estimation apparatus is configured to extract information of the interference signal source using an interference signal of the interference signal source detected in the propagation space, and analyze a reflected wave structure in the propagation space based on information of the interference signal source, to set the variable array structure adaptive to the signal measurement environment based on information of the interference signal source, and detect a plurality of signals reflected in all directions of the propagation space by controlling a size of an aperture based on the variable array structure, and to estimate a position of the inference signal source using the reflected wave structure and the plurality of signals.

* * * * *